(12) United States Patent
Kim et al.

(10) Patent No.: US 9,876,203 B2
(45) Date of Patent: Jan. 23, 2018

(54) BATTERY MODULE ASSEMBLY WITH NOVEL STRUCTURE

(71) Applicant: LG CHEM, LTD., Seoul (KR)

(72) Inventors: Juhan Kim, Daejeon (KR); Jun Yeob Seong, Daejeon (KR); Bum Hyun Lee, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 268 days.

(21) Appl. No.: 14/762,335

(22) PCT Filed: May 15, 2013

(86) PCT No.: PCT/KR2013/004290
§ 371 (c)(1),
(2) Date: Jul. 21, 2015

(87) PCT Pub. No.: WO2014/185566
PCT Pub. Date: Nov. 20, 2014

(65) Prior Publication Data
US 2016/0056425 A1    Feb. 25, 2016

(51) Int. Cl.
*H01M 2/10*    (2006.01)
*H01M 2/20*    (2006.01)
(Continued)

(52) U.S. Cl.
CPC ....... *H01M 2/1077* (2013.01); *H01M 2/1061* (2013.01); *H01M 2/1072* (2013.01);
(Continued)

(58) Field of Classification Search
CPC .................... H01M 2/1077; H01M 2/1094
(Continued)

(56) References Cited

U.S. PATENT DOCUMENTS

| 5,879,831 A | 3/1999 | Ovshinsky et al. |
| 2006/0267545 A1 | 11/2006 | Lee et al. |

(Continued)

FOREIGN PATENT DOCUMENTS

| CN | 101073168 A | 11/2007 |
| CN | 101517777 A | 8/2009 |

(Continued)

OTHER PUBLICATIONS

International Search Report issued in PCT/KR2013/004290, dated Feb. 17, 2014.

*Primary Examiner* — Basia Ridley
*Assistant Examiner* — James Erwin
(74) *Attorney, Agent, or Firm* — Birch, Stewart, Kolasch & Birch, LLP (57) ABSTRACT

Disclosed herein is a battery module assembly including two or more battery modules, each of which includes two or more plate-shaped battery cells vertically stacked such that electrode leads of the battery cells are arranged in one direction, each of the battery modules having terminal parts connected to an outside, a base plate including module receiving parts, on tops of which the battery modules are loaded in a state in which electrode terminals of the battery modules are arranged in one direction, the base plate being provided at an outer edge thereof with upwardly bent side walls, an upper cover plate including downwardly bent side walls formed at opposite sides thereof on the basis of the electrode terminals of the battery modules, the upper cover plate being fixed on the base plate to form a top of the battery module assembly, a plate-shaped assembly cover loaded on tops of the battery modules and coupled to the battery modules in a fastening fashion, the assembly cover fixing a cable, and an electrically insulative module cover mounted (Continued)

on the electrode leads of the battery cells and fixed to the base plate and an assembly cover in a fastening fashion.

12 Claims, 11 Drawing Sheets

(51) Int. Cl.
*H01M 2/30* (2006.01)
*H01M 2/22* (2006.01)

(52) U.S. Cl.
CPC ......... *H01M 2/1094* (2013.01); *H01M 2/206* (2013.01); *H01M 2/22* (2013.01); *H01M 2/30* (2013.01); *H01M 2220/10* (2013.01)

(58) Field of Classification Search
USPC .......................................................... 429/90
See application file for complete search history.

(56) References Cited

U.S. PATENT DOCUMENTS

| | | |
|---|---|---|
| 2011/0115437 A1 | 5/2011 | Kasai |
| 2011/0206948 A1* | 8/2011 | Asai ................... H01M 2/0473 429/7 |
| 2011/0223457 A1 | 9/2011 | Lee et al. |
| 2012/0045665 A1* | 2/2012 | Park ................... H01M 2/1022 429/7 |
| 2012/0171527 A1 | 7/2012 | Hiroma |
| 2013/0045401 A1 | 2/2013 | Yoon et al. |
| 2013/0115497 A1* | 5/2013 | Ertel ................... H01M 2/1077 429/99 |
| 2013/0143086 A1 | 6/2013 | Lee et al. |
| 2013/0236761 A1 | 9/2013 | Seong et al. |
| 2015/0162648 A1 | 6/2015 | Yang et al. |
| 2016/0056427 A1 | 2/2016 | Kim et al. |

FOREIGN PATENT DOCUMENTS

| | | |
|---|---|---|
| EP | 2450981 A1 | 5/2012 |
| JP | 2008-147045 A | 6/2006 |
| JP | 2006-185668 A | 7/2006 |
| JP | 2007-18881 A | 1/2007 |
| JP | 2007-73510 A | 3/2007 |
| JP | 2007-200712 A | 8/2007 |
| JP | 2007-273143 A | 10/2007 |
| JP | 2008-521199 A | 6/2008 |
| JP | 2008-166009 A | 7/2008 |
| JP | 2008-243412 A | 10/2008 |
| JP | 2009-529217 A | 8/2009 |
| JP | 2011-65908 A | 3/2011 |
| JP | 2011-76871 A | 4/2011 |
| JP | 2011-100619 A | 5/2011 |
| JP | 2012-79666 A | 4/2012 |
| JP | 2012-511802 A | 5/2012 |
| JP | 2013-55054 A | 3/2013 |
| JP | 2016-508659 A | 3/2016 |
| JP | 6058163 B2 | 1/2017 |
| KR | 10-2006-0114549 A | 11/2006 |
| KR | 10-2009-0105319 A | 10/2009 |
| KR | 10-2009-0107443 A | 10/2009 |
| KR | 10-2012-0016354 A | 2/2012 |
| KR | 10-2012-0039796 A | 4/2012 |
| KR | 10-2013-0048759 A | 5/2013 |
| WO | WO 2010/008026 A2 | 1/2010 |
| WO | WO 2011/045841 A1 | 4/2011 |
| WO | WO 2012/023754 A1 | 2/2012 |
| WO | WO 2012/070783 A2 | 5/2012 |
| WO | WO 2013/031614 A1 | 3/2013 |

* cited by examiner

BATTERY MODULE ASSEMBLY WITH NOVEL STRUCTURE

TECHNICAL FIELD

The present invention relates to a battery module assembly having a novel structure, and more particularly to a battery module assembly including two or more battery modules, each of which includes two or more plate-shaped battery cells vertically stacked such that electrode leads of the battery cells are arranged in one direction, each of the battery modules having terminal parts connected to an outside, a base plate including module receiving parts, on tops of which the battery modules are loaded in a state in which electrode terminals of the battery modules are arranged in one direction, the base plate being provided at an outer edge thereof with upwardly bent side walls, an upper cover plate including downwardly bent side walls formed at opposite sides thereof on the basis of the electrode terminals of the battery modules, the upper cover plate being fixed on the base plate to form a top of the battery module assembly, a plate-shaped assembly cover loaded on tops of the battery modules and coupled to the battery modules in a fastening fashion, the assembly cover fixing a cable, and an electrically insulative module cover mounted on the electrode leads of the battery cells and fixed to the base plate and an assembly cover in a fastening fashion.

BACKGROUND ART

In recent years, secondary batteries, which can be charged and discharged, have been widely used as an energy source for wireless mobile devices. In addition, the secondary batteries have attracted considerable attention as an energy source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle or large-sized devices, such as vehicles, use a middle or large-sized battery module including a plurality of battery cells electrically connected to each other because high output and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the weight of the pouch-shaped battery is small, and the manufacturing cost of the pouch-shaped battery is low.

For example, small-sized mobile devices, such as mobile phones, personal digital assistants (PDA), digital cameras, and laptop computers, use one or several small-sized, lightweight battery cells for each device according to the reduction in size and weight of the corresponding products. On the other hand, middle or large-sized devices, such as electric bicycles and hybrid electric vehicles, use a battery module (which may also be referred to as a "middle or large-sized battery pack") having a plurality of battery cells electrically connected with each other because high output and large capacity are necessary for the middle or large-sized devices. The size and weight of the battery module is directly related to an accommodation space and power of the corresponding middle or large-sized device. For this reason, manufacturers are trying to manufacture small-sized, lightweight battery modules.

Conventionally, to this end, a plurality of battery modules is fixed as follows. The battery modules are stacked, fixing plates are mounted at the upper and lower ends of the battery module assembly to fix the battery modules, and the battery modules are fixed again in a frame. In this method, however, overall volume of the battery module assembly is increased. In addition, a conventional battery module cover is not provided to fix the battery module assembly but is provided as a structure dependent upon other fixing members. For this reason, it is necessary to provide an additional fixing device. Furthermore, the battery module cover is provided merely to protect terminal parts of the battery modules at which electrode leads are formed from the outside or to insulate the terminal parts of the battery modules.

Therefore, there is a high necessity for technology that is capable of fundamentally solving the above problems.

DISCLOSURE

Technical Problem

The present invention has been made to solve the above problems and other technical problems that have yet to be resolved.

It is an object of the present invention to provide a battery module assembly having a novel structure configured to have a specific structure in which battery modules, an assembly cover, and an upper cover plate are mounted at a base plate including receiving parts, thereby restraining the increase in volume of the battery module assembly and improving rigidity of the battery module assembly, and the battery modules and cables disposed in the battery modules are stably fastened and fixed.

It is another object of the present invention to provide a battery module assembly having a novel structure in which the battery module assembly is assembled such that the battery module assembly has a compact structure, members received in the battery module assembly are stably fixed, and terminal parts including electrode leads are fixed and protected such that the terminal parts cannot release from the battery module assembly or cannot be rotated, thereby simultaneously improving safety and efficiency of the production process.

Technical Solution

In accordance with one aspect of the present invention, the above and other objects can be accomplished by the provision of a battery module assembly including two or more battery modules, each of which includes two or more plate-shaped battery cells vertically stacked such that electrode leads of the battery cells are arranged in one direction, each of the battery modules having terminal parts connected to an outside, a base plate including module receiving parts, on tops of which the battery modules are loaded in a state in which electrode terminals of the battery modules are arranged in one direction, the base plate being provided at an outer edge thereof with upwardly bent side walls, an upper cover plate including downwardly bent side walls formed at opposite sides thereof on the basis of the electrode terminals of the battery modules, the upper cover plate being fixed on the base plate to form a top of the battery module assembly, a plate-shaped assembly cover loaded on tops of the battery modules and coupled to the battery modules in a fastening fashion, the assembly cover fixing a cable, and an electrically insulative module cover mounted on the electrode leads of the battery cells and fixed to the base plate and an assembly cover in a fastening fashion.

The base plate, the upper cover plate, the assembly cover, and the module cover of the battery module assembly according to the present invention each have a specific structure. Consequently, it is possible to stably mount and fix the battery modules to the module receiving parts of the base plate in a state in which the battery module assembly has a compact structure. In addition, it is possible to improve overall rigidity of the battery module assembly and to stably fasten and fix cables disposed on the base plate.

In addition, it is not necessary to provide an additional component during an assembly process of the battery module assembly according to the present invention. Consequently, it is possible to improve efficiency of a production process together with the provision of the compact structure. Furthermore, it is possible to stably fix the battery modules and to easily mount and fix the components, such as the cables and the upper cover plate, using the module cover.

In a preferred example, each of the battery cells may be a prismatic secondary battery or a pouch-shaped secondary battery.

The prismatic secondary battery may be configured to have a structure in which an electrode assembly is mounted in a prismatic metal case in a sealed state, and the pouch-shaped secondary battery may be configured to have a structure in which an electrode assembly is mounted in a laminate sheet including a resin layer and a metal layer in a sealed state.

The secondary battery may be a lithium secondary battery exhibiting high energy density, discharge voltage, and output stability. Other components of the lithium secondary battery will hereinafter be described in detail.

In general, the lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed. On the other hand, the negative electrode may be manufactured by applying a mixture of a negative electrode active material and a binder to a negative electrode current collector and drying the mixture. The above-mentioned ingredients may be further included as needed.

The separator is disposed between the negative electrode and the positive electrode. The separator may be made of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains, and therefore a detailed description thereof will be omitted.

The lithium secondary battery may be manufactured using an ordinary method well known in the art to which the present invention pertains. That is, the lithium secondary battery may be manufactured by disposing a porous separator between a positive electrode and a negative electrode and injecting an electrolytic solution thereinto.

The positive electrode may be manufactured, for example, by applying a slurry containing a lithium transition metal oxide active material, a conductive material, and a binder to a current collector and drying the applied slurry. In the same manner, the negative electrode may be manufactured, for example, by applying a slurry containing a carbon active material, a conductive material, and a binder to a thin current collector and drying the applied slurry.

In a preferred example, each of the battery modules may be configured such that the battery cells are connected in parallel to each other.

Specifically, the parallel connection between the battery cells may be achieved using a 'ㄱ'-shaped or '['-shaped bus bar.

The battery cells may be fixed to a cartridge frame, and each of the battery modules may be configured to have a structure in which cartridge frames are stacked.

The cartridge frame is a member exhibiting predetermined rigidity. The cartridge frame protects the battery cells from external impact and secures stable mounting of the battery cells. In addition, the battery cells are arranged such that electrode leads of the battery cells are directed to one side by the cartridge frame. Consequently, it is possible to more easily achieve electrical parallel connection between the battery cells via the bus bar.

In addition, the electrode leads of the battery cells electrically connected in parallel to each other via the bus bar may be connected to electrode terminals, and the electrode terminals may be disposed at the same side as the side at which the electrode leads are arranged. Consequently, a battery module configured to have a structure in which battery cells are fixed to a cartridge frame, and cartridge frames are stacked may be electrically connected to another battery module via electrode terminals formed at one side of each of the battery modules. In addition, a detection member for voltage detection may be easily mounted at each battery module.

The module cover may include a first hook for fixing cables connected to the electrode terminals of each of the battery modules, a protrusion for positioning fixedly engaged with the assembly cover, and a second hook mounted and fixed to each of the battery modules.

The first hook may include one or more protruding parts for preventing release or rotation of the terminal parts.

In the above structure, the module cover may protect the electrode leads of the battery cells from external impact. In addition, the module cover is made of an electrically insulated material. Consequently, it is also possible for the module cover to electrically isolate the electrode leads of the battery cells from the outside.

Specifically, the protruding parts of the first hook may hold and fix terminal parts and cables. When the cable terminals and the cables are electrically connected to each other, therefore, it is possible to prevent release of the connections between the cable terminals and the cables from the battery module assembly or rotation of the cable terminals. In addition, it is possible to more rapidly assemble the battery modules in a process of assembling the battery module assembly and to secure a safer production process.

Furthermore, it is possible to more rapidly assemble the battery modules since the module cover includes the second hook that can be easily mounted to and separated from each of the battery modules.

The module cover is made of a material exhibiting predetermined rigidity. Consequently, it is possible for the module cover to integrate the plate-shaped battery cells stacked in each of the battery modules and, at the same time, to protect each of the battery modules from external impact. In addition, the battery module integrated by the module cover may be integrated with the assembly cover since the module cover includes the protrusion that can be fixed to a predetermined position of the assembly cover.

In a preferred example, the module cover may further include an insulative protection cover for electrically isolating the electrode terminals of each of the battery modules from the outside.

Specifically, the connections between the terminal parts and the cables are electrically exposed to the outside. Consequently, the protection cover may perform a function of electrically isolating the connections between the terminal parts and the cables from the outside.

The insulative protection cover may include one or more third hooks that can be easily mounted to or separated from the module cover. The third hooks may be, for example, hook type connection parts. However, the present invention is not limited thereto.

Consequently, the module cover and the insulative protection cover may improve efficiency of an assembly process and secure an electrically safer assembly process of the battery module assembly.

In a preferred example, the module cover may further include a bushing insertion hole, through which the module cover is mounted and fixed to the base plate.

Specifically, the module cover may further include a bushing insertion hole, through which the module cover is fastened and fixed to the upper cover plate, the cover assembly, and the base plate. The module cover is fastened and fixed to the upper cover plate and the base plate by a bushing inserted into the bushing insertion hole and fastening members. The fastening members may be bolts. However, the present invention is not limited thereto.

Consequently, the battery module integrated with the module cover is stably mounted and fixed to the base plate through the bushing insertion hole, and therefore, the battery module assembly may exhibit stable and desired rigidity.

In accordance with another aspect of the present invention, there is provided a device including the battery module assembly with the above-stated construction as a power source. Specifically, the device may be a power supply for emergency, a power supply for computer rooms, a portable power supply, a power supply for medical facilities, a power supply for fire extinguishing facilities, a power supply for alarm facilities, or a power supply for refuge facilities. However, the present invention is not limited thereto.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
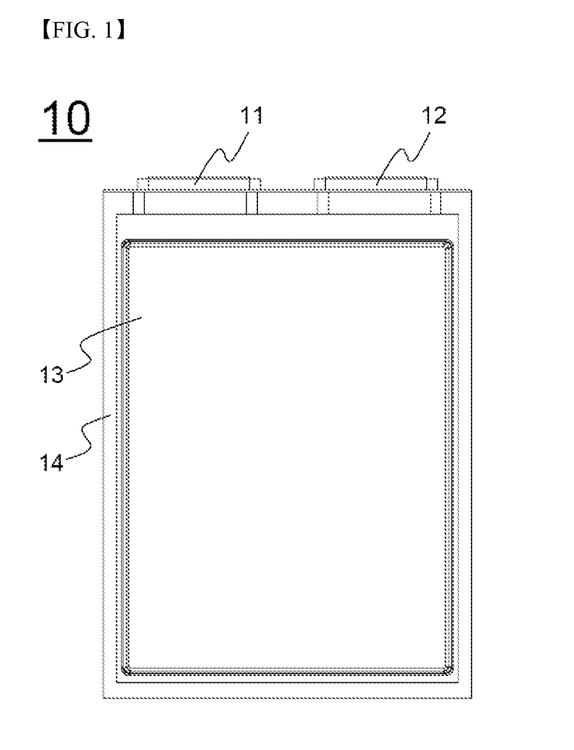
FIG. 1 is a plan view showing a battery cell according to an embodiment used in the present invention.

FIG. 1 is a plan view showing a plate-shaped battery, cell 10 having electrode leads 11 and 12 formed at one end thereof.

Referring to FIG. 1, the battery cell 10 is a plate-shaped battery cell having electrode leads 11 and 12 formed at one end thereof. Specifically, the plate-shaped battery cell 10 is configured to have a structure in which an electrode assembly (not shown) is mounted in a pouch-shaped battery case 13 made of a laminate sheet including a metal layer (not shown) and a resin layer (not shown) while being sealed by a sealed portion 14. The plate-shaped battery cell 10 may be generally referred to as a pouch-shaped battery cell 10.

Figure 2:
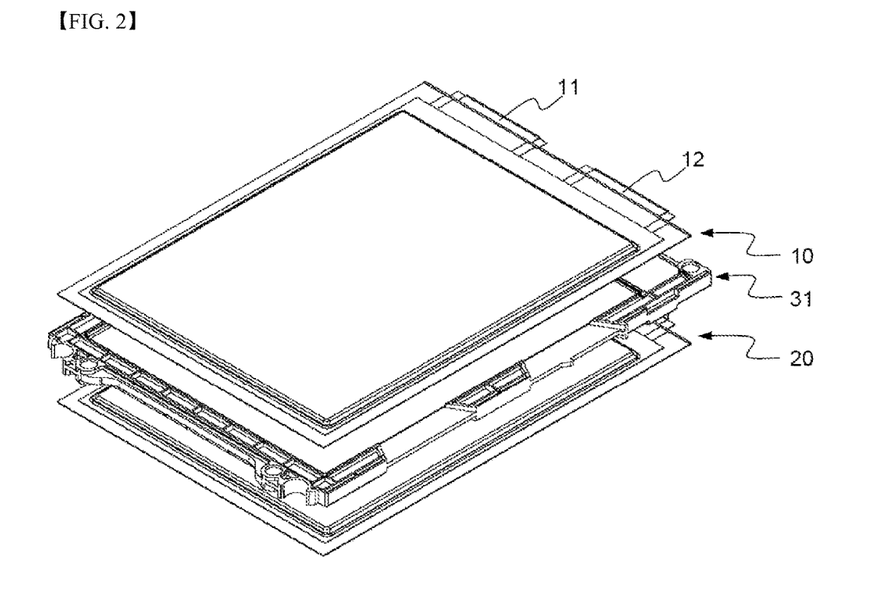
FIG. 2 is a perspective view showing that battery cells, one of which is shown in FIG. 1, are mounted at a cartridge frame according to an embodiment.
Figure 3:
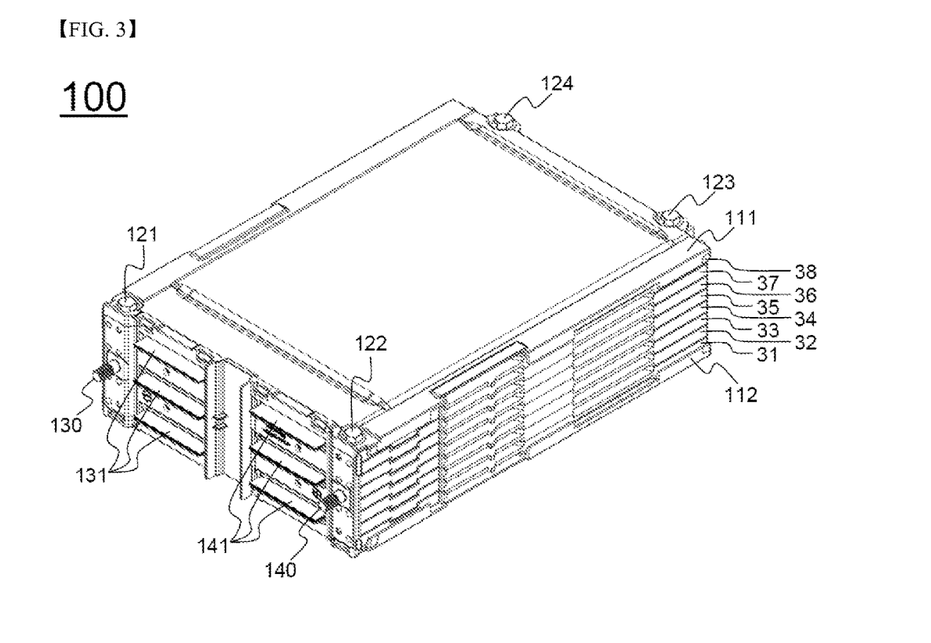
FIG. 3 is a perspective view showing a battery module according to an embodiment of the present invention.

FIG. 2 is a perspective view showing that battery cells 10 and 20 are mounted at a cartridge frame 31, and FIG. 3 is a perspective view showing a battery module 100 assembled by cartridge frames 31 to 38.

Referring to these figures, the battery cells 10 and 20 are mounted at the cartridge frame 31, and the cartridge frames 31 to 38 are fixed to a cartridge frame upper end cover 111 and a cartridge frame lower end cover 112 by bolts (not shown) to constitute the battery module 100. In addition, the electrode leads 11 and 12 of the battery cells 10 and 20 mounted at the respective cartridge frames 31 to 38 are arranged at one side of the battery module 100 and are electrically connected in parallel to each other via '['-shaped bus bars 131 and 141. The electrode leads 11 and 12 electrically connected in parallel to each other are connected to a positive electrode terminal 130 and a negative electrode terminal 140, respectively.

Figure 4:
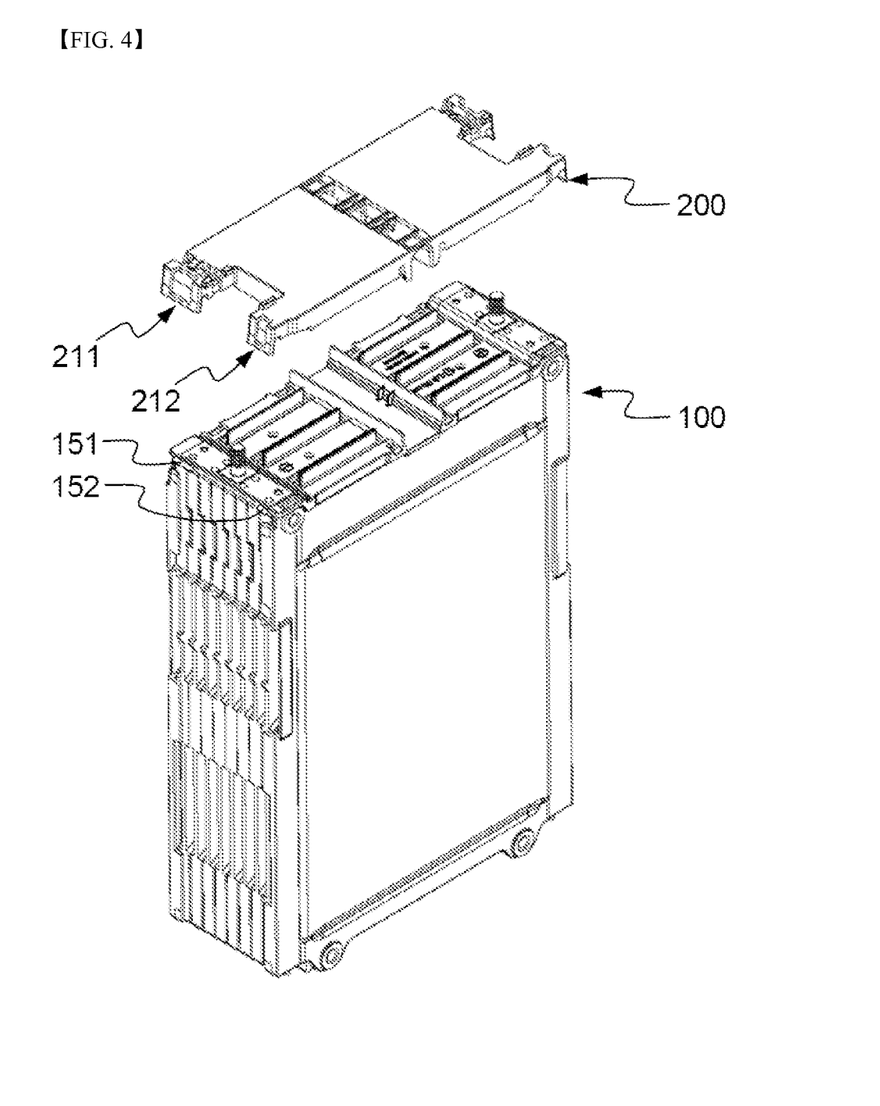
FIGS. 4 and 5 are perspective views showing a series of processes in which a module cover according to an embodiment is mounted at the battery module of FIG. 3.
Figure 5:
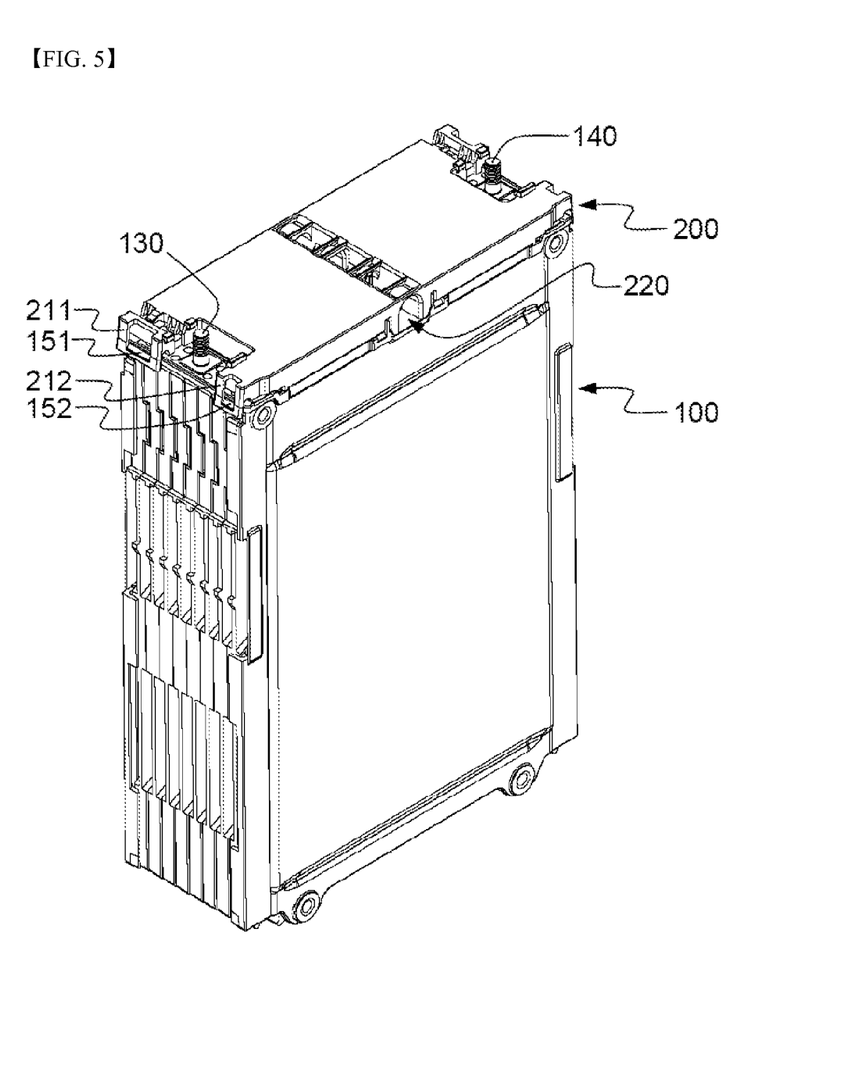

FIGS. 4 and 5 are perspective views showing that a module cover 200 is mounted at the battery module 100 of FIG. 3.

Referring to these figures, protruding parts 151 and 152 each having a hook structure are formed at each edge of one side of the battery module at which the module cover 200 is mounted. In addition, the module cover 200 is provided with second hooks 211 and 212 corresponding to the protruding parts 151 and 152.

In the hook structure, engagement and disengagement are very easily performed. In an assembly process of the battery module 100, therefore, work efficiency is improved. The hook structure will hereinafter be described in more detail.

Figure 6:
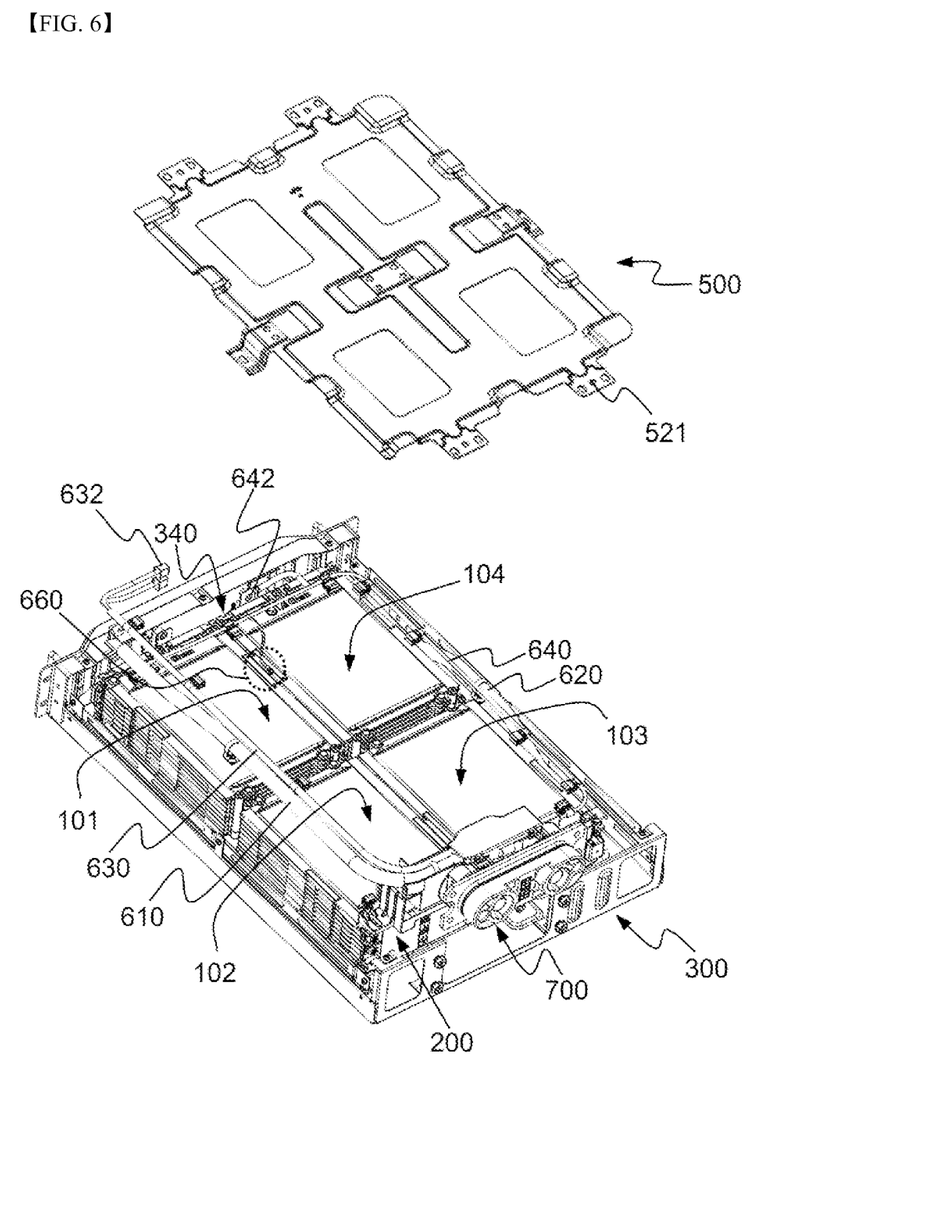
FIG. 6 is a perspective view showing that cables and an assembly cover are mounted at upper ends of battery modules located on a base plate.
Figure 7:
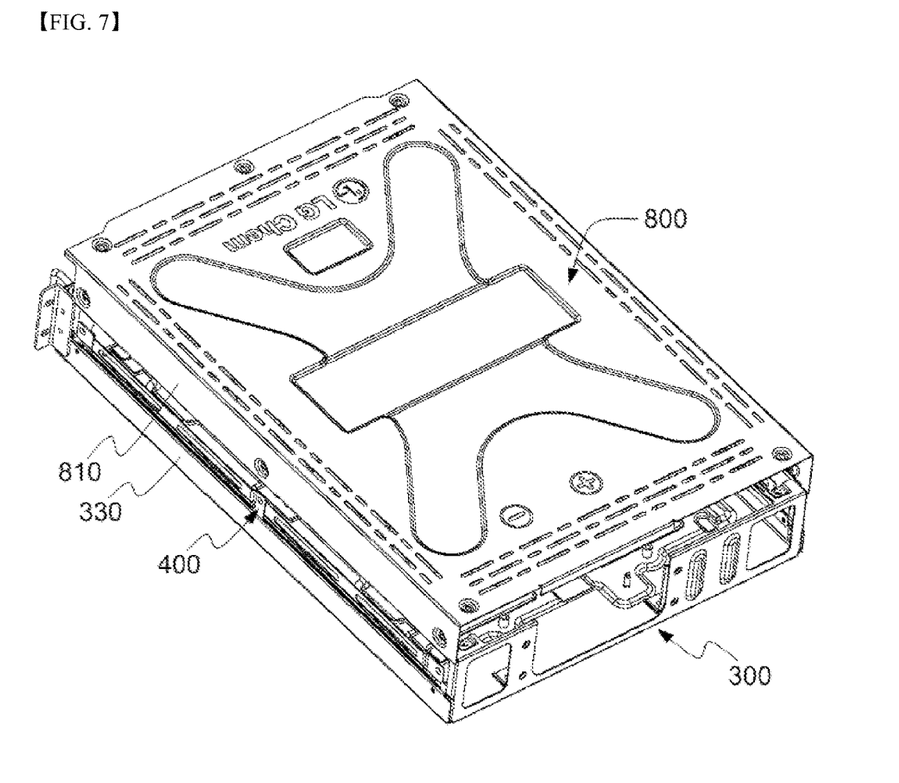
FIG. 7 is a perspective view showing that an upper cover plate is mounted at the base plate.

FIG. 6 is a perspective view showing that cables and an assembly cover 500 are mounted at the upper ends of battery modules 101, 102, 103, and 104 located on a base plate 300, and FIG. 7 is a perspective view showing that an upper cover plate 800 is mounted at the base plate 300.

Referring to these figures, the assembly cover 500 is provided with a plurality of fastening holes 521, through which the assembly cover 500 is fixed to the module cover 200, and power cables 610 and 620, a voltage detection cable 640, and a communication cable 630 are mounted and fixed to the assembly cover 500 by band clips (not shown).

The voltage detection cable 640 and the communication cable 630 are fixed by the band clips (not shown), and the band clips are mounted and fixed to the assembly cover 500.

A temperature sensor 660 is separated from the voltage detection cable 640 and mounted and fixed to the assembly cover 500.

A battery management system (BMS) (not shown) is mounted at a central part 340 of the rear of the base plate 300, and a connection terminal 642 of the voltage detection cable 640 and a connection terminal 632 of the communication cable 630 are connected to terminal parts (not shown) of the BMS.

In addition, a plug-in connector 700, which is configured to have a housing structure in which ends of the power cable 610 and the communication cable 630 are concentrated, is mounted at a central part of the front of the base plate 300.

Since various components are assembled in the plug-in connector 700 having the housing structure, the number of components constituting the battery module assembly is reduced, an assembly process and management are easily performed, and the internal space of the battery module assembly is efficiently used.

The upper cover plate 800 is provided with downwardly bent side walls 810, and the base plate 300 is provided at the outer edge thereof with upwardly bent side walls 330. The downwardly bent side walls 810 are coupled to the upwardly bent side walls 330 by welding using brackets 400.

Figure 8:
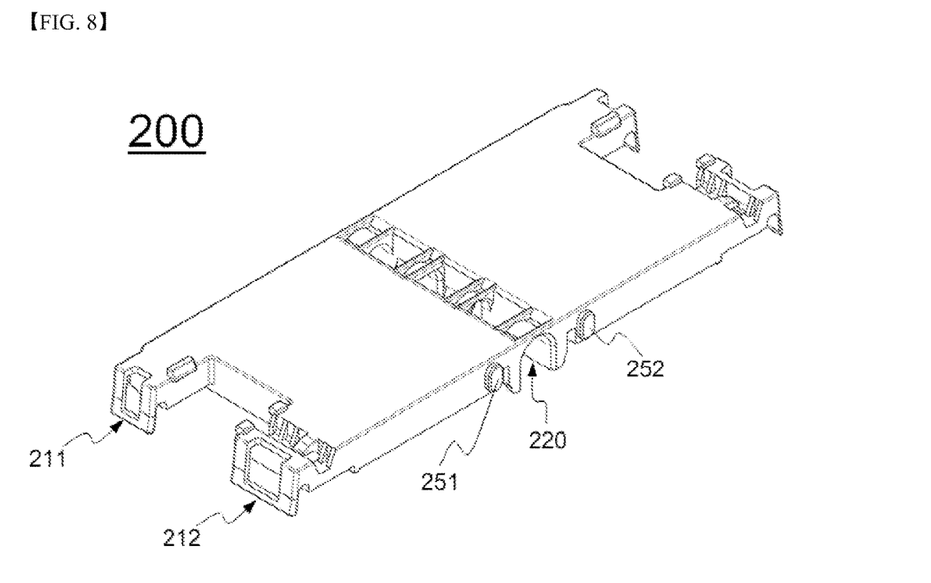
FIG. 8 is a perspective view showing a module cover according to an embodiment of the present invention.
Figure 9:
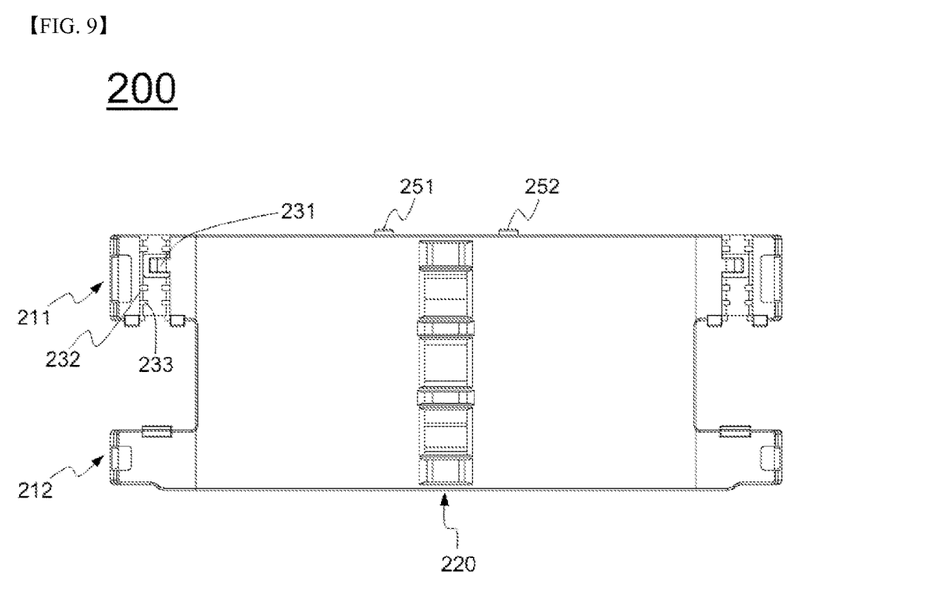
FIG. 9 is a front view showing the module cover according to the embodiment of the present invention.
Figure 10:
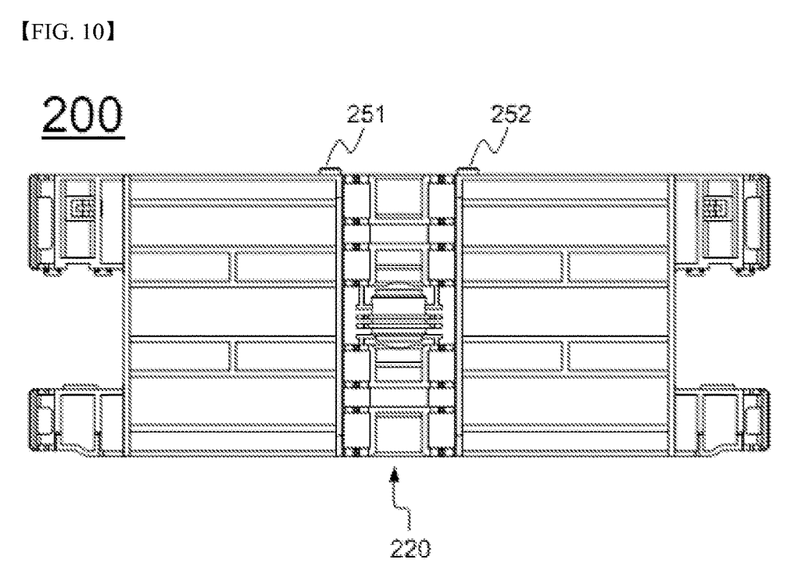
FIG. 10 is a bottom view showing the module cover according to the embodiment of the present invention.
Figure 11:
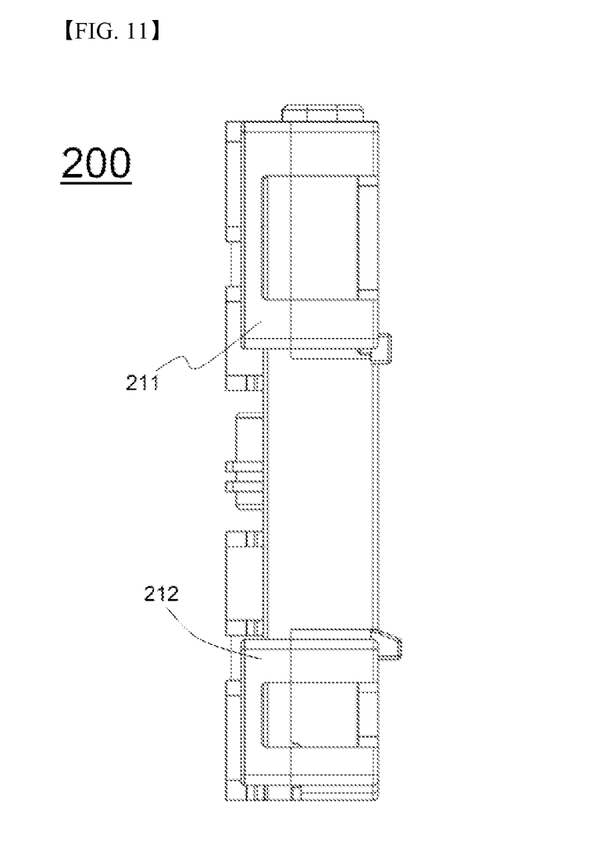
FIG. 11 is a side view showing the module cover according to the embodiment of the present invention.

FIG. 8 is a perspective view showing a module cover according to an embodiment of the present invention, FIGS. 9 and 10 are front and bottom views of the module cover 200, and FIG. 11 is a side view of the module cover.

Referring to these figures together with FIGS. 6 and 7, the module cover 200 includes a bushing insertion hole 220, through which the module cover is fixed to the base plate 330, second hooks 211 and 212 coupled to the protruding parts 151 and 152 of each of the battery modules, and a first hook 231, including cable terminal fixing protrusions 232 and 233, for fixing the ends of the cables.

The module cover 200 is provided at the top thereof with upward protrusions 251 and 252, which are fixedly engaged in the fastening holes 521 of the assembly cover 500. The fastening holes 521 for fixing enable the battery modules to be correctly mounted at the assembly cover 500.

The battery modules 101, 102, 103, and 104 correctly mounted and fixed to the assembly cover 500 as described above are fixed again by bolting through the bushing insertion hole 220 formed at the module cover 200 and a bushing (not shown) mounted in the bushing insertion hole 220.

Specifically, bolts (not shown), having been inserted through the fastening holes 521 of the assembly cover 500 and the bushing insertion holes 220 of the respective module covers 200, are fixed to the base plate 300 to more securely fix the battery modules fixed to the module covers 200.

Figure 12:
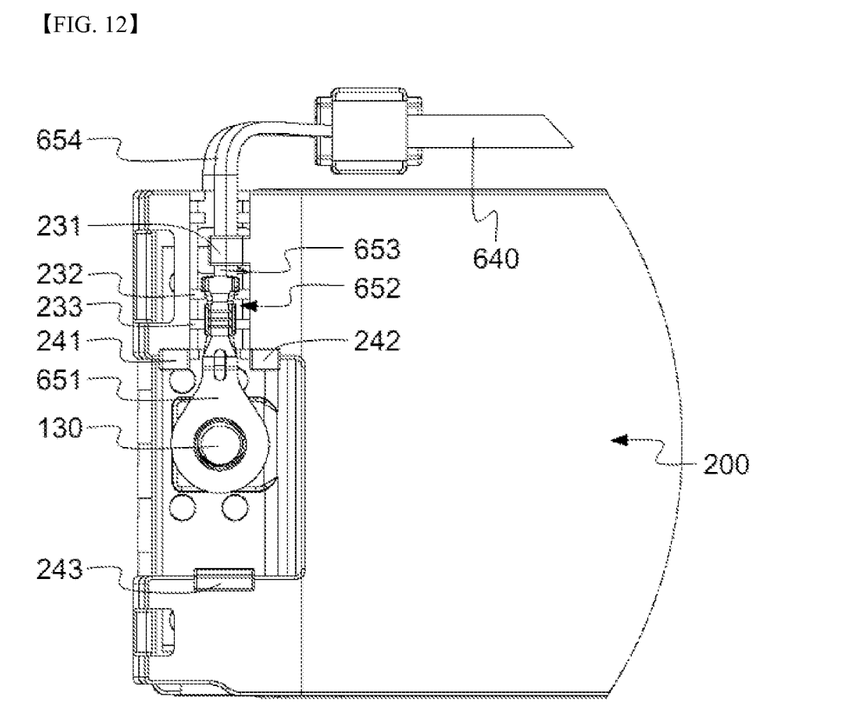
FIG. 12 is a front enlarged view showing an electrode terminal part of the module cover according to the embodiment of the present invention.
Figure 13:
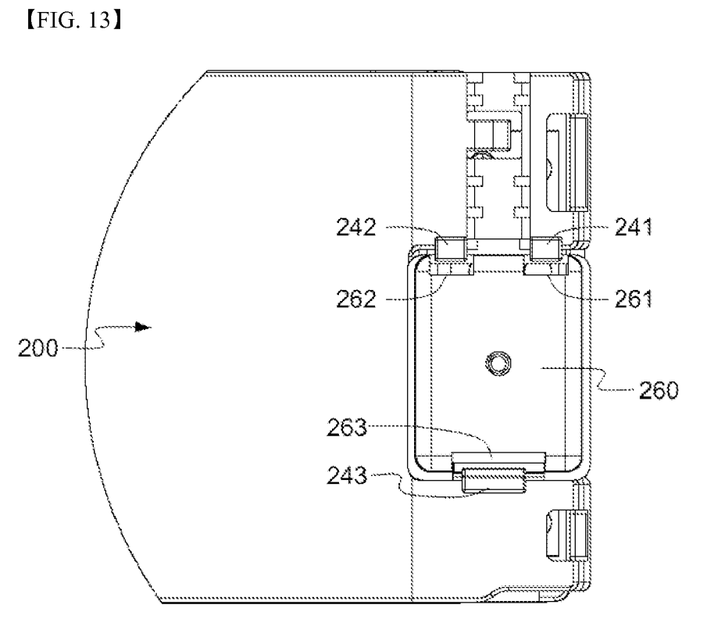
FIG. 13 is a front enlarged view showing that an insulative protection cover is mounted at the module cover of FIG. 12.

FIG. 12 is a front enlarged view showing an electrode terminal part of the module cover 200 according to the embodiment of the present invention, and FIG. 13 is a front enlarged view showing that an insulative protection cover 260 is mounted at the module cover 200 of FIG. 12.

Referring to these figures together with FIGS. 8 to 10, the module cover 200 includes a first hook 231, including cable terminal fixing protrusions 232 and 233, for fixing the ends of the cables. A cable terminal 651 is mounted at the electrode terminal 130, and a cable connection part 652 of the cable terminal 651 is fixed by the cable terminal fixing protrusions 232 and 233 of the module cover 200.

Cable ends 653 and 654 of the voltage detection cable 640 are fixed by the first hook 231 of the module cover 200. During electrical connection between the cable connection part 652 and the cable end 653 fixed as described above, release of the cable connection part 652 or the cable end 653 from the battery module assembly or rotation of the cable connection part 652 or the cable end 653 is prevented, thereby improving efficiency of an assembly process.

In addition, the insulative protection cover 260 is mounted at the module cover 200 for protecting electrical connection between the electrode terminal 130 and the voltage detection cable 640 from the outside.

The insulative protection cover 260 includes third hooks 261, 262, and 263. In addition, the module cover 200 is provided at positions thereof corresponding to the third hooks 261, 262, and 263 of the insulative protection cover 260 with connection parts 241, 242, and 243 each having a structure corresponding to the hook structure such that the third hooks 261, 262, and 263 can be engaged with the connection parts 241, 242, and 243. Consequently, engagement and disengagement between the module cover 200 and the insulative protection cover 260 are easily achieved.

Consequently, the module cover 200 and the insulative protection cover 260 may improve efficiency of an assembly process and, in addition, secure an electrically safer assembly process.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module assembly according to the present invention is configured to have a structure in which battery modules, an assembly cover, and an assembly type module cover are mounted at a base plate including receiving parts. Consequently, it is possible to assemble the battery module assembly such that the battery module assembly has a compact structure, to restrain the increase in volume of the battery module assembly, and to improve rigidity of the battery module assembly.

In addition, it is possible to stably fasten and fix the battery modules and cables and members received in the battery modules and to prevent release of terminal parts of the battery modules from the battery module assembly or rotation of the terminal parts of the battery modules using the electrically insulative module cover, thereby safely protecting the cables, the members received in the battery modules, and the terminal parts from external impact. Furthermore, it is possible to simultaneously improve safety and efficiency of a production process.

The invention claimed is:

1. A battery module assembly comprising:
   two or more battery modules, each of which comprises two or more plate-shaped battery cells vertically stacked such that electrode leads of the battery cells are arranged in a horizontal direction, each of the battery modules having terminal parts connected to an outside;
   a base plate comprising module receiving parts, on tops of which the battery modules are loaded in a state in which electrode terminals of the battery modules are arranged in one direction, the base plate being provided at an outer edge thereof with upwardly bent side walls;
   an upper cover plate comprising downwardly bent side walls formed at opposite sides thereof on the basis of the electrode terminals of the battery modules, the upper cover plate being fixed on the base plate to form a top of the battery module assembly;
   a plate-shaped assembly cover loaded on tops of the battery modules and coupled to the battery modules in a fastening fashion, the assembly cover fixing a cable; and
   an electrically insulative module cover mounted on the electrode leads of the battery cells and fixed to the base plate via a vertically oriented bushing insertion hole and fixed to the plate-shaped assembly cover via protrusions, wherein each protrusion engages a fastening hole of said plate-shaped assembly cover,
   wherein the horizontal direction is parallel to a top surface of the base plate, on the top surface where the battery modules are loaded.

2. The battery module assembly according to claim 1, wherein each of the battery cells is a prismatic secondary battery or a pouch-shaped secondary battery.

3. The battery module assembly according to claim 2, wherein the pouch-shaped secondary battery is configured to have a structure in which an electrode assembly is mounted in a laminate sheet comprising a resin layer and a metal layer in a sealed state.

4. The battery module assembly according to claim 1, wherein each of the battery modules is configured such that the battery cells are connected in parallel to each other.

5. The battery module assembly according to claim 4, wherein the parallel connection between the battery cells is achieved using a 'ㄱ'-shaped or '['-shaped bus bar,
   wherein said bus bar has a direct mechanical connection to electrode terminals of said battery cells.

6. The battery module assembly according to claim 1, wherein the battery cells are fixed to a cartridge frame, and each of the battery modules is configured to have a structure in which cartridge frames are stacked.

7. The battery module assembly according to claim 1, wherein the electrically insulative module cover comprises:
   a first hook for fixing cables connected to the electrode terminal of the battery module; and
   a second hook mounted and fixed to the battery module.

8. The battery module assembly according to claim 7, wherein the first hook comprises one or more protruding parts for preventing release or rotation of the terminal parts.

9. The battery module assembly according to claim 1, wherein the electrically insulative module cover further comprises an insulative protection cover for electrically isolating the electrode terminals of each of the battery modules from an outside.

10. The battery module assembly according to claim 9, wherein the protection cover is provided with one or more third hooks for fixing the electrically insulative module cover.

11. A device comprising a battery module assembly according to claim 1 as a power source.

12. The device according to claim 11, wherein the device is a power supply for emergency, a power supply for computer rooms, a portable power supply, a power supply for medical facilities, a power supply for fire extinguishing facilities, a power supply for alarm facilities, or a power supply for refuge facilities.

* * * * *